H. H. CRAIGIE.
Water-Closet.
No. 8,626. Reissued Mar. 18, 1879.
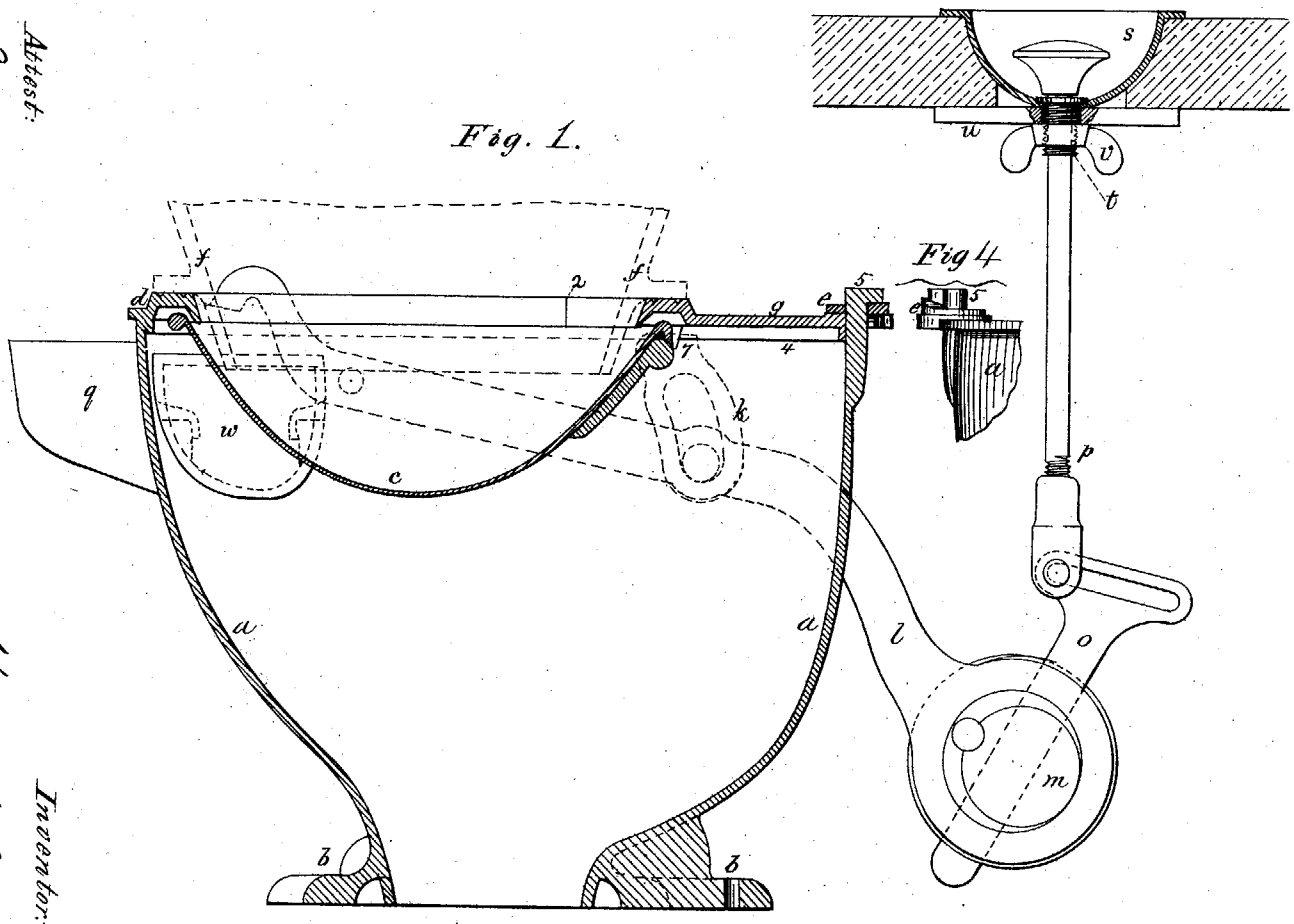
*Attest:*
Edward H. Wales.
Chas. M. Higgins.
*Inventor:*
Hugh H. Craigie
by S. H. Wales & Son
his Attys.
N. PETERS, PHOTO-LITHOGRAPHER, WASHINGTON, D. C.

2 Sheets—Sheet 2.
H. H. CRAIGIE.
Water-Closet.
No. 8,626. Reissued Mar. 18, 1879.
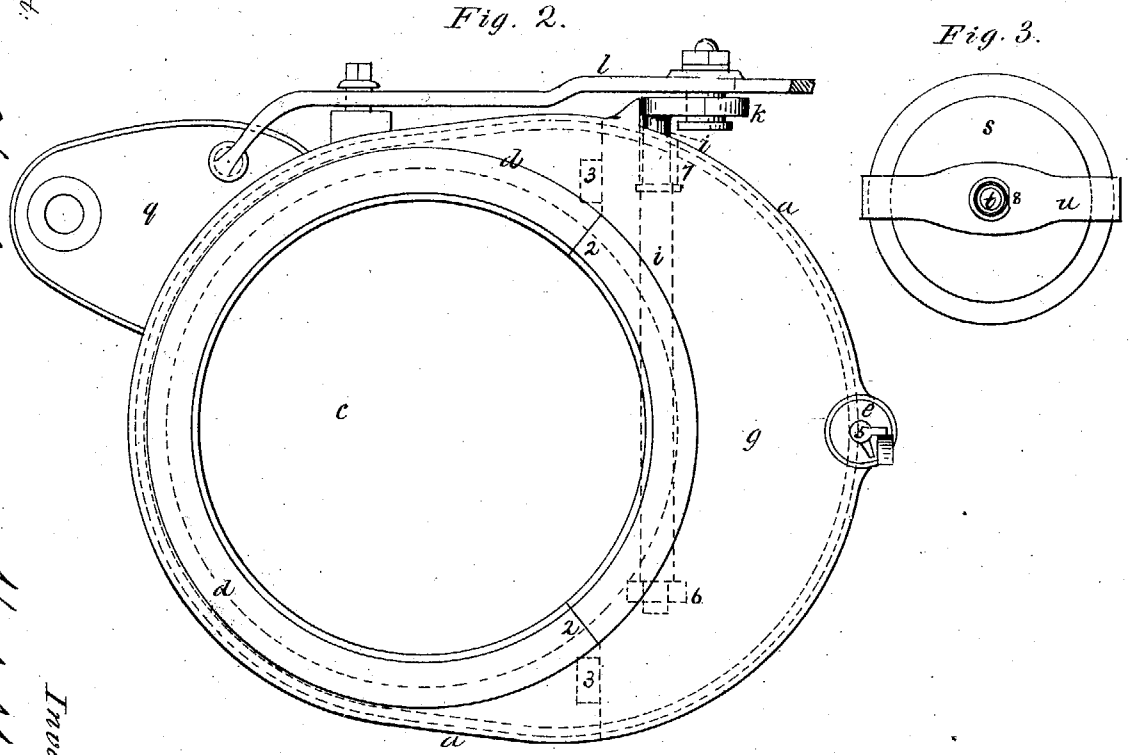
*Attest:*
Edward H. Wales
Chas. M. Higgins.
*Inventor:*
Hugh H. Craigie
by H. H. Wales Son,
his attys
N. PETERS, PHOTO-LITHOGRAPHER, WASHINGTON, D. C.

UNITED STATES PATENT OFFICE.

HUGH H. CRAIGIE, OF STAMFORD, CONNECTICUT.

IMPROVEMENT IN WATER-CLOSETS.

Specification forming part of Letters Patent No. 89,857, dated May 11, 1869; Reissue No. 8,626, dated March 18, 1879; application filed February 7, 1879.

*To all whom it may concern:*

Be it known that I, HUGH H. CRAIGIE, formerly a resident of New York city, but now residing at Stamford, Fairfield county, State of Connecticut, have invented certain new and useful Improvements in Water-Closets, of which the following is a specification:

One object of my invention is to provide a means of introducing or withdrawing the pan from the hopper, and at the same time have but a small extent of joints to pack and render tight by the use of putty; and this part of my invention embodies a number of novel features, as hereinafter described.

Another feature of my invention may be stated to consist in the attachment of the socket for the pull to the casing of the closet by means of a screw-thimble and an independent bridge and nut, so that the socket will be firmly drawn down to its place without having to be rotated, as heretofore done, in affixing the socket, as hereinafter fully set forth.

Figure 1 of the drawings annexed presents a vertical section of my improved water-closet, and Fig. 2 shows a plan of the same. Fig. 3 gives an inverted plan of the socket, bridge, &c., of the pull, and Fig. 4 is a fragmentary side view of an inclined clamping-washer on the hopper, hereinafter explained.

In the drawings, *a* is the hopper, rising above the flange *b*, and made of a shape to receive the pan *c*, so that it may swing to empty the contents, or be closed up against the under side of the flange *d* and around the lower edge of the basin *f*. (Shown by dotted lines in Fig. 1.) The flange *d* is made as one piece, cast with the hopper *a*, so that there is no joint between it and the hopper. The removable cover *g* unites at the joint 2 with the flange *d*, forming part of the seat or support for the basin *f*. Upon the under side of this cover *g* lugs are provided at 3 3, (see dotted lines in Fig. 2,) that pass under the edge of the flange *d* to hold down the cover at these points, and there is also a downward flange, 4, sitting within the hopper *a* to aid in retaining the putty that is introduced to make the joint tight.

Upon the hopper *a* is a stud, 5, with an overhanging or hooked end. The cover *g* sits down over this stud, and the parts are clamped together by an inclined-plane washer, *e*, that sits over the stud and is partially revolved, so that its inclined plane, acting under the hooked end of the stud 5, shall press the plate or cover *g* to its place, but allow of the easy removal of the parts when desired. This stud 5 may be made separate from the hopper *a*, and hook under studs thereon, instead of being cast with said hopper *a*.

The pan *c* is set on an axis, *i*, formed in one piece with the cam-arm *k*, and securely soldered or brazed to the pan *c*. This axis *i* is supported at one end in the bearing-lug 6 on the under side of the cover *g*, (see dotted lines in Fig. 2,) and the other bearing for this axis *i* is at 7, in boxes formed half in the cover *g* and the other half in the hopper *a*.

By this construction the pan *c* can be taken out for repairs or replaced with great facility when the earthen basin *f* is not resting upon the flange *d* and cover *g*, it being understood that the axis of the pan *c* is placed in its bearings on the under side of *g*, and then introduced into the hopper *a* as the cover *g* is brought down to its place. This construction of these parts is strong and cheap, and great facility is given for fitting the parts together.

I make the hollow projection *q* and its top, on which the valve is to rest, in one piece, cast with the hopper *a*, and I cover the opening from said projection into the hopper by a removable plate, *w*, (see Fig. 1,) that is held by lugs, and prevents paper or other material getting into the hollow projection *q*.

The lever *l*, weight *m*, link *o*, pull *p*, and projection *q* on the side of the hopper *a* are not herein claimed, as they are set forth in previous patents granted to me.

To attach the socket or cup *s* for the pull to the wooden casing of the closet, I employ, in connection with the bridge *u*, a screw-thimble, *t*, and clamping-nut *v*, which are separate or independent from the bridge and socket, as shown. The screw-thimble is threaded its whole, or nearly its whole, length, as shown, and its length is made ample, so that it may be equally suited for thick or thin wood-work, as will be understood. The screw-thimble is passed through the hole in the bottom of the socket, and projects through the opening in the center of the bridge, as shown, the socket being seated against the upper side of the timber or wood-work, while the bridge seats against the under side, as usual. A flange is formed on the head or upper edge of the thimble, which engages with the edges of the hole in the socket, as shown, while a nut, *v*, is screwed on its lower projecting end tight up against the bridge, and thus serves to secure the socket firmly to the wood-work in a quick and convenient manner, as may be observed, obviating the inconvenient turning of the socket or bridge, as has been usual heretofore.

The screw-thimble may have one of its sides flattened, and the hole in the bridge may be similarly flattened on one side, as shown in Fig. 3; or several such flattened faces may be formed on both these parts; or they may be otherwise fitted, so as to prevent the thimble turning in the bridge when the nut is screwed up; but, although this is sometimes desirable, it is not essential.

What I claim as my invention is—

1. The movable cover *g*, forming a portion of the support for the basin, in combination with the flange *d*, formed as a part of the hopper *a*, and constituting the other portion of the support for the basin, substantially as set forth.

2. The bearing-lug 6 on the under side of the cover *g* and the divided bearings at 7, in combination with the axis *i*, pan *c*, and arm *k*, as and for the purposes set forth.

3. The combination, with the socket *s* and a screw-threaded thimble, of the loose bridge *u*, having an opening therein, which permits the free passage of the said neck without necessitating the turning of the bridge or socket, together with the independent clamping-nut *v*, screwed on the thimble against the under side of the bridge, substantially as and for the purpose set forth.

4. The combination, with the cup or socket *s* and loose bridge *u*, of the separate screw-thimble *t* and independent nut *v*, arranged and operating substantially as herein shown and described.

5. The screw-thimble *t*, formed as specified, in combination with the non-rotating bridge *u* and socket *s*, substantially as set forth.

6. The inclined-plane washer *e*, combined with the hooked stud 5, as and for the purpose specified.

7. The cover *w*, applied to the inner end of the hollow projection *q*, for the purposes set forth.

HUGH H. CRAIGIE.

Witnesses:

EDWARD H. WALES,
CHAS. M. HIGGINS.